United States Patent [19]

Vallauri et al.

[11] Patent Number: 4,654,241
[45] Date of Patent: Mar. 31, 1987

[54] CABLE JOINT MONOLITHIC SLEEVE INSTALLING APPARATUS

[75] Inventors: Ubaldo Vallauri, Monza; Gino Lombardi, Quattordio, both of Italy

[73] Assignee: Societa' Cavi Pirelli S.p.A., Italy

[21] Appl. No.: 682,766

[22] Filed: Dec. 18, 1984

[30] Foreign Application Priority Data

Dec. 27, 1983 [IT] Italy ............................... 24382 A/83

[51] Int. Cl.⁴ .............................................. B32B 1/08
[52] U.S. Cl. ....................................... 428/36; 29/235; 156/49; 174/84 R
[58] Field of Search ................... 29/235, 450; 156/49; 174/84 R; 428/36

[56] References Cited

U.S. PATENT DOCUMENTS

| | | | |
|---|---|---|---|
| 3,946,480 | 3/1976 | Dienes | 29/235 |
| 4,040,178 | 8/1977 | Amphlett | 29/235 X |
| 4,238,639 | 12/1980 | Palmieri | 174/88 C X |
| 4,391,661 | 7/1983 | Izraeli | 156/165 X |
| 4,506,430 | 3/1985 | Guzay | 29/235 X |

FOREIGN PATENT DOCUMENTS 1142050 2/1969 United Kingdom .

Primary Examiner—Robert A. Dawson
Attorney, Agent, or Firm—Brooks Haidt Haffner & Delahunty

[57] ABSTRACT

A process for surrounding joined cable ends with an elastic, monolithic sleeve which comprises expanding the bore of the sleeve, positioning the sleeve around the joined ends and then, permitting the bore to contract elastically, radially and progressively from one end of the sleeve toward the other. Also, apparatus for performing the process which comprises a rigid tube having a bore larger than the exterior size of the joined ends, having an ogive at one end, having a collar secured to the tube at the other end and at least two rigid, annular bodies mounted on the tube, one of annular bodies being engageable with an end of the sleeve and being slidable on the tube and the other annular body engaging the collar, and having threaded rods engaging the annular bodies through rotatable, threaded bushings for forcing the annular bodies apart in the axial direction of the tube to remove the tube from the sleeve.

4 Claims, 2 Drawing Figures

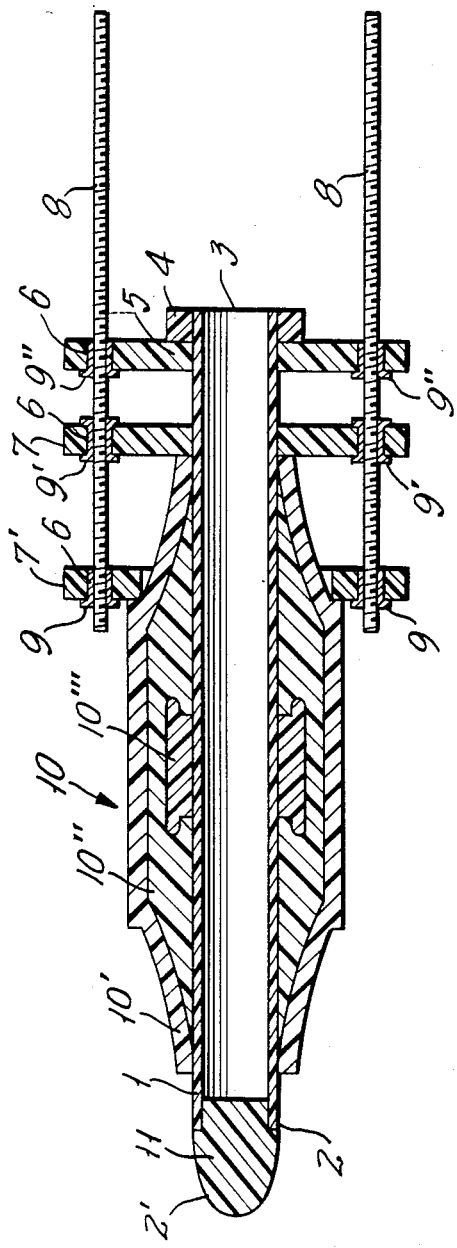
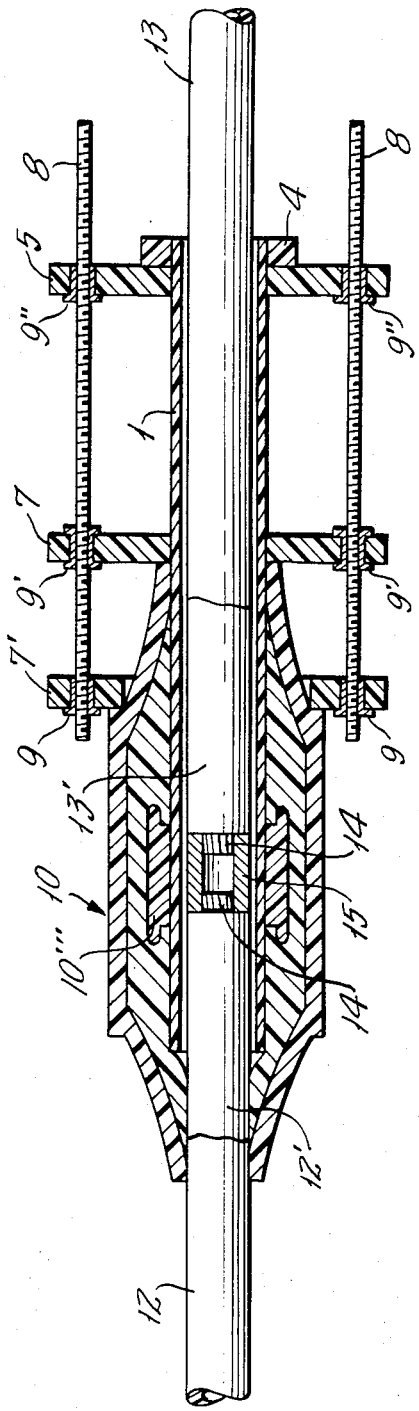

CABLE JOINT MONOLITHIC SLEEVE INSTALLING APPARATUS

The present invention relates to a process and to a device for forming cable joints and relates, more particularly, for forming joints for cables having extruded insulations of the type comprising a preformed, monolithic sleeve fitted onto the extremities of the two cables which are coupled together.

Cable joints having extruded insulation of the type comprising a monolithic sleeve are, per se, already known. This type of joint is, in practice, normally utilized in the field sector of low and medium voltage cables. However, their use has already been suggested for the high voltage cable field. See, for example, U.K. Pat. No. 1,142,050. See also U.S. Pat. No. 4,238,639 which discloses a monolithic sleeve.

To be able to utilize the known monolithic sleeves, of the type used for low and medium voltage cable joints, for the formation of high voltage cable joints, modifications were rendered necessary to take into consideration the greater electrical stresses that exist. These modifications have substantially brought about a greater precision in the workmanship and an increase in the sleeve thickness as compared to those sleeves which are intended for forming the low and medium voltage cable joints.

Whereas the problems have substantially been solved in the case of monolithic sleeve joints for low and medium voltages, to date, no success has been had, in practice, when using monolithic sleeve joints for high voltages in spite of the fact that such joints appear to be utilizable in theory.

The reason for the lack of success is that due to the high electric stresses existing in high voltage joints, it is necessary for the monolithic sleeve to exert pressures upon the cable extremities which are considerably higher than the pressures required for medium and/or low voltage joints, so as to guarantee the absence of any trace of air and, in this way, to avoid any risks of electrical perforations occurring.

For obtaining the high pressures required, it is necessary to subject the monolithic sleeve to elastic deformation in the radial direction equal to about 30% of its thickness. With the known processes for forming joints, it is impossible to achieve such high pressures.

In fact, the known processes for forming monolithic sleeve joints include fitting the monolithic sleeve onto one of the two extremities of the cables to be joined, carrying out the mechanical and electrical coupling between the cable conductors and causing the sleeve to slide on the insulations of the joined cables until it becomes centered in the junction zone.

As the pressure that the monolithic sleeve exercises on the cables increases, so also does the difficulty had in causing said sleeve to slide on the insulations of the cables because the force to be applied for causing said sliding also increases.

In the case of joints for high voltage cables, the pressure values, which the sleeve applies to the cable insulations, are such as to cause grooves and tears to appear on the contacting surfaces during the sliding, and in correspondence to such grooves and tears, small quantities of air are inevitably present in the joint. Since, in high voltage cables, the electric stresses are high, these small quantities of trapped air between the monolithic sleeve and cable insulation, are the cause of the perforations occurring in the joints.

In practice, this drawback is rarely encountered in the instance of the monolithic sleeve joints for low and/or medium voltage cables.

One object of the present invention is to realize, in practice, reliable joints, especially in the case of high voltage cables provided with a monolithic sleeve, while facilitating, at the same time, the forming of the joints themselves.

Another object of the present invention is a process for forming cable joints of the type comprising a preformed, monolithic sleeve fitted onto the extremities of joined-together cables, characterized by the fact of comprising the steps of:

(a) elastically expanding the monolithic sleeve by increasing the diametrical dimensions of its inner bore;

(b) positioning the monolithic sleeve, in its expanded condition, on the junction zone of two cables; and (c) causing, through a recovery of the elastic deformation of the monolithic sleeve and starting from one extremity of the latter and progressively proceeding along the entire sleeve length until reaching the other extremity, a uniform radial contraction of the sleeve which gradually puts the latter into contact with the cables' extremities which are joined together.

Another object of the present invention is a device for forming cable joints of the type comprising a preformed, monolithic sleeve fitted onto the joined-together extremities of the cable, characterized by the fact of comprising:

(1) a rigid tubular body, whose inner cavity has a greater diameter than that of the outer surface of the cables to be connected by a joint, said body being provided with an ogive or bullet-shaped piece removably connected to one extremity of said rigid tubular body; and (2) means for withdrawing the rigid tubular body from the monolithic sleeve after the sleeve has been centered with respect to the zone where the joint is to be realized.

Preferably, the device according to the present invention possesses the characteristic that the coefficient of friction between the outer surface of the rigid tubular body and the material of the monolithic sleeve is not higher than 0.2.

Moreover, the means for withdrawing the rigid tubular body from the internal bore of the monolithic sleeve when it is centered in the junction-zone of the cables, preferably comprises the following elements:

A. A collar mounted on the outer surface of the extremity of the rigid tubular body which is opposite the one to which the ogive is removably connectable and secured to the body;

B. At least one movable, rigid, annular body engageable with the monolithic sleeve; and C. Means which exerts a force between the collar and the annular body for drawing said collar away from said rigid annular body.

Preferably, the last-mentioned means is constituted by threaded rods which pass through holes made in the collar at one extremity of the rigid tubular body surface and into the rigid annular body engageable with the monolithic sleeve. Said holes are provided with threaded bushings which are rotatable.

Other objects and advantages of the present invention will be apparent from the following detailed description of the presently preferred embodiments thereof, which description should be considered in conjunction with the accompanying drawings in which:

FIG. 1 is an axial cross-section of the device according to the invention for fitting a monolithic sleeve onto the junction zone of two cables with a monolithic sleeve thereon; and FIG. 2 is an axial cross-section of the device, illustrating its use in applying the monolithic sleeve to a cable joint.

The process for forming a joint according to the present invention comprises, as basic steps, the steps of elastically expanding a monolithic sleeve for the cable joints, positioning the sleeve in its elastically expanded condition in the junction zone of the conductors of two cables, and causing a uniform radial contraction starting from one sleeve extremity and then proceeding progressively along the sleeve itself up to the other extremity of the sleeve.

In this way, the monolithic sleeve comes into contact with the insulations of the joined cables without any sliding, and the progression of the contact, associated with the sleeve's uniform radial contraction, causes a total and reliable expulsion of the air existing in the contact zone between the sleeve and the cable insulations.

Of course, the basic steps of the process according to the present invention, set forth above, are accompanied by other steps which are necessary for carrying out the joining of the cables. One particular embodiment of the process, according to the present invention, is set forth hereinafter.

First, the extremities of the two cables to be joined together in one joint are prepared.

To this end, the conductors, the insulation and the semi-conductive outer layers of the two cables are bared at each of the extremities of the two cables and for a prefixed length. This operation can be done to advantage at the same time that an elastic expansion is produced in the monolithic sleeve for the joint for increasing the diametrical dimensions of its bore and more particularly, for increasing, in a uniform manner, the diameter of said bore.

At this point, the monolithic sleeve for the joint, in an elastically expanded state, is fitted onto the prepared end of one of the two cables to be joined together. After this step is completed, the mechanical and electrical connection is carried out between the bared conductors at the extremities of the two cables, in an already known way, while disposing a metallic adapter of the already known type, above the junction zone of the conductors.

At this point, there follows the step of centering the monolithic sleeve, with respect to the junction zone for the conductors of the two cables, by shifting it without allowing it to drag along the extremity of the cable on which it was previously positioned.

Once the centering of the monolithic sleeve in the junction zone of the two cables has been effected, there follows the step of inducing a progressive and uniform contraction, in the radial direction, along the sleeve itself, starting from one sleeve extremity, so as to bring the surface of the bore of the sleeve into contact with the outer surfaces of the prepared and joined ends of the cables.

For carrying out the process set forth and according to the present invention, there is utilized a device which is shown in FIG. 1.

As can be seen in FIG. 1, the device comprises a rigid, tubular body 1 made, for example, of a plastic material, having a bore the diameter of which is greater than the outer dimensions of the cable ends to which the body 1 is applied for forming the joint.

An ogive, or bullet shaped piece 2' is removably connected to one extremity 2 of the tubular body 1, and at the opposite extremity 3 of said tubular body 1, there is provided a collar 4 secured to the tubular body 1 in fixed relation thereto.

A rigid plate 5, provided with through-holes 6, abuts the collar 4. A further pair of rigid plates 7 and 7' also provided with through holes 6, are disposed around the rigid tubular body 1 and are axially slidable with respect to the body 1. The plates 7 and 7' are engageable with the end surface of the monolithic sleeve 10 at the outer semi-conductive layer 10'. The sleeve 10 also has an intermediate insulating layer 10", and an electric field modifier 10''' made of a semi-conductive material. The sleeve 10 is made of an elastomeric material which can be radially expanded by the tube 1.

Threaded rods 8 are threaded into rotatable, threaded bushings 9 in the through holes 6 of the plates 5, 7 and 7'.

As previously stated, an ogive 2' is removably connectable to the rigid, tubular body 1. The removable connection, between the ogive 2' and the rigid tubular body 1, is carried out by inserting a cylindrical portion 11 of the ogive 2' into the bore of the tubular body 1.

The use of the device, according to the present invention, is as set forth hereinafter.

With the ogive 2' applied to the rigid, tubular body 1 and with the plates 5, 7 and 7' connected together by the threaded rods 8 and already fitted on said rigid, tubular body 1 in such a way that the plate 5 is in contact with the collar 4, a monolithic sleeve 10 for cable joints is forced over the tubular body 1. In this way, provision is made for elastically expanding the monolithic sleeve 10, and the sleeve 10 assumes the position shown in FIG. 1.

The functioning of the device and sleeve 10 shown in FIG. 1, for superimposing the monolithic sleeve 10 in the junction zone of two cables, thereby realizing a joint, is as follows (reference being made to FIG. 2):

(i) Firstly, the ogive 2' is removed from the rigid, tubular body 1;

(ii) After the ogive 2' has been removed from the rigid, tubular body 1, the bore of the latter is a through-cavity, and the device (shown in FIG. 1) is fitted over a prepared end of one of the two cables 12 and 13 to be coupled together in the joint;

(iii) At this point there is effectuated, in an already known way, the mechanical and electrical connection between the cable conductors 14, at their ends which have already been prepared previously by baring, for prefixed tracts, both the conductors 14 as well as the cable insulations 12' and 13';

(iv) After effecting the mechanical and electrical connection between the cables' conductors, and after having superimposed an already known metallic adapter 15 over said connection, the rigid tubular body 1 is caused to slide axially in such a way as to center the monolithic sleeve 10 with respect to the junction zone of the two cables; and (v) Once said centering has been effectuated, the threaded bushings 9" are rotated, in an obvious way, to cause a relative drawing-apart, between the pair of plates 7 and 7' and the plate 5.

With the action of the threaded bushings 9", the outer surface of the rigid, tubular body 1 slides with respect to the bore cavity of the monolithic sleeve 10.

As a result of the relative sliding between the body 1 and the sleeve 10, the extremity of the monolithic sleeve 10, which is farthest away from the extremity 3 of the rigid, tubular body 1, is no longer supported by the body 1 and, due to elastic recovery of the material forming the monolithic sleeve 10, a uniform radial contraction of the sleeve 10 takes place with a movement only in the radial direction. The end of the sleeve 10 remote from said extremity 3 moves radially into contact with the surface of the cable 12 and therefore, without any sliding of the inner surface of the sleeve 10 against the cable surface.

In this manner, one extremity of the monolithic sleeve 10 is locked onto the cable 12 and the situation, at this point, is the one shown in FIG. 2.

Upon continuing with the rotation of the threaded bushings 9", the relative sliding movement between the rigid, tubular body 1 and the monolithic sleeve 10 continues.

The relative movement, between the monolithic sleeve 10 and the rigid, tubular body 1, is rendered possible, without any movement in the longitudinal direction between monolithic sleeve 10 and cable 12 (obviously, starting from when one extremity of the sleeve 10 is brought into contact with a cable 12), due to the fact that the friction coefficient of the outer surface of the rigid, tubular body 1 with respect to the material of the sleeve 10 is selected to be low and preferably, not over 0.2. This is a very small value as compared to the friction coefficients, comprised between 0.3 and 1, between a monolithic sleeve 10 and a cable insulation.

The above-described operation is continued until such time as the rigid, tubular body 1 is removed from inside the monolithic sleeve 10, i.e., until the entire inner surface of the monolithic sleeve 10 has been perfectly mated with the surfaces of the ends of the two cables 12 and 13 which are joined together.

After the tube 1 has been withdrawn from the sleeve 10, the rods 8 are removed and the body 1, the collar 4 and the plates 5, 7 and 7' are cut in a manner which will permit their removal from the cable 13. For example, the plates 5, 7 and 7' and the collar 4 may be cut in half and a longitudinal slit may be cut in the tube 1.

From the description of the process and the device of the present invention which has been given, it can easily be understood how the proposed objects of the invention are achieved.

In fact, by following the process of the present invention and effecting it by means of the device, which also forms part of the invention, the formation of scorings on the wall of the bore of the monolithic sleeve 10, or on the surfaces of the prepared ends of the coupled cables is eliminated. Hence, what is prevented is any risk of air being trapped in this zone, even to a minimum extent, which could result in the danger of electrical perforations occurring.

Moreover, even the way in which the coupling is carried out between monolithic sleeve 10 and cables 12 and 13 assures, to the greatest extent, that no possibility exists of any air being trapped in the contact zone between monolithic sleeve 10 and the surfaces of the cables.

In fact, the progressiveness (starting from one extremity of the sleeve 10) of the radially uniform contraction of the sleeve, causes a progressive expulsion of air, from one extremity to the other of the monolithic sleeve 10.

Moreover, by means of a radial contraction of the sleeve, which eliminates any small possibility of sliding taking place between the monolithic sleeve and outer surface of the cables, not only is any scoring prevented, but also any danger of alterations occurring in the structure of the elements forming the monolithic sleeve, especially in the zone where the semi-conductive parts of the sleeve itself, are pressing against the insulation of the cables.

Finally, the forming of the joint through the process and device of the invention, is considerably facilitated because the forces to be applied for fitting the monolithic sleeve on the cables, are reduced as compared to "known" processes because of the low coefficient of friction which exists between the inner surface of the sleeve and the rigid, tubular body which is part of the device for forming the joint and for realizing the process.

Although preferred embodiments of the present invention have been described and illustrated, it will be apparent to those skilled in the art that various modifications may be made without departing from the principles of the invention.

The embodiment of the invention in which an exclusive property or privilege is claimed are defined as follows:

1. Apparatus for forming a cable joint by surrounding joined together cable ends with an elastic, monolithic sleeve having a bore which extends from one end of said monolithic sleeve to the other end thereof and having a cross-sectional size at least as small as the exterior size of said joined together cable ends, said apparatus comprising:

a rigid tube having a bore larger than the exterior size of said joined together cable ends, an exterior size larger than said cross-sectional size of said bore of said monolithic sleeve, said rigid tube being insertable into said bore of said sleeve for expanding said sleeve and having a collar secured thereto at one end thereof and an ogive removably mounted at its other end for inserting said tube into the bore of said monolithic sleeve;

means acting between said tube and said sleeve for moving said tube axially thereof with respect to the bore of said sleeve after said joined together cable ends have been inserted in said tube with said monolithic sleeve on said tube, said means comprising at least one rigid annular body, slidably mounted on said tube and engageable with an end of said sleeve and adjustable means acting between the tube collar and said rigid annular body for forcing said collar axially away from said rigid annular body and thereby withdrawing said tube from the bore of said sleeve and permitting said sleeve to engage said joined together cable ends.

2. Apparatus for forming a cable joint by surrounding joined together cable ends with an elastic, monolithic sleeve having a bore of a size at least as small as the exterior size of said joined together cable ends, said apparatus comprising:

a rigid tube having a bore larger than the exterior size of said joined together cable ends, and insertable into said bore of said sleeve for expanding said sleeve, said rigid tube having a collar secured thereto at one end thereof and an ogive removably mounted at its other end, the materials of the wall of the bore of said sleeve and the exterior surface of said tube being selected to provide a coefficient of friction therebetween which is not greater than 0.2;

means acting between said tube and said sleeve for moving said tube axially thereof with respect to the bore of said sleeve and comprising at least one rigid annular body, slidably mounted on said tube and engageable with an end of said sleeve and adjustable means acting between the tube collar and said rigid annular body for forcing said collar axially away from said rigid annular body and thereby withdrawing said tube from the bore of said sleeve.

3. Apparatus for forming a cable joint by surrounding joined together cable ends with an elastic, monolithic sleeve having a bore of a size at least as small as the exterior size of said joined together cable ends, said apparatus comprising:

a rigid tube having a bore larger than the exterior size of said joined together cable ends and insertable into said bore of said sleeve for expanding said sleeve, said rigid tube having a collar secured thereto at one end thereof and an ogive removably mounted at its other end;

means acting between said tube and said sleeve for moving said tube axially thereof with respect to the bore of said sleeve and comprising two rigid annular bodies slidably mounted on said tube, one of said bodies being engageable with an end of said sleeve and the other of said bodies engaging said collar, and adjustable means acting between the tube collar and said rigid annular body for forcing said collar axially away from said rigid annular body and thereby withdrawing said tube from the bore of said sleeve, said adjustable means comprising threaded rods in threaded engagement with at least one of said annular bodies and engageable with the other of said annular bodies.

4. Apparatus as set forth in claim 3 wherein said threaded rods are in threaded engagement with said one of said annular bodies through rotatable, threaded bushings mounted on said last-mentioned one of said annular bodies.

* * * * *